Patented Jan. 9, 1923.

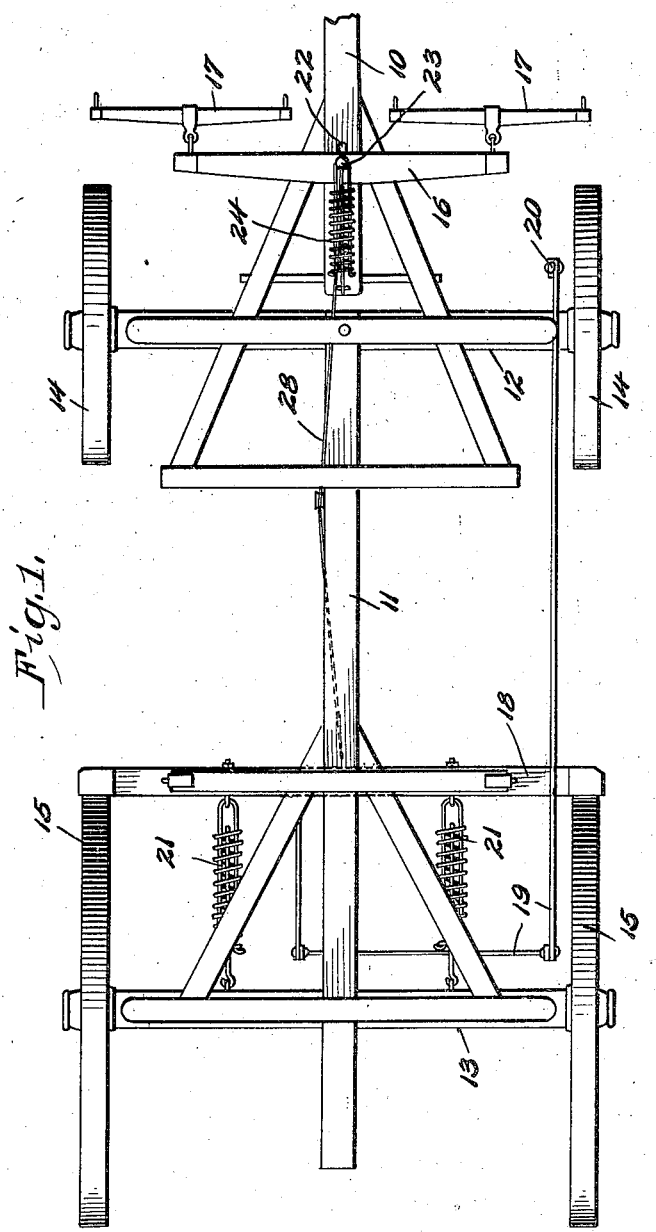
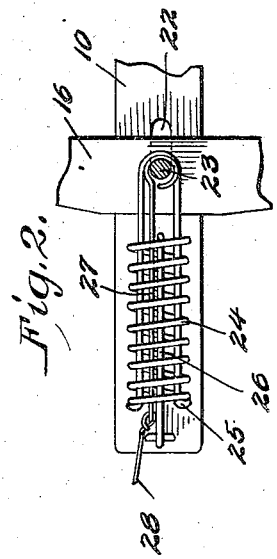

1,441,348

UNITED STATES PATENT OFFICE.

WILLIAM W. HENDERSON, OF MINERAL WELLS, TEXAS.

AUTOMATIC BRAKE AND DRAFT APPLIANCE.

Application filed July 23, 1921. Serial No. 487,134.

*To all whom it may concern:*

Be it known that WILLIAM W. HENDERSON, a citizen of the United States, residing at Mineral Wells, in the county of Palo Pinto and State of Texas, has invented certain new and useful Improvements in Automatic Brake and Draft Appliances, of which the following is a specification.

This invention relates to improvements in wagon brakes and draft devices, the details and objects of which will appear as described in the following specification in connection with the accompanying drawings, and hereinafter set forth and claimed. In the drawings forming a part of this specification, like characters of reference are used to designate the same parts in the two figures, in which,—

Figure 1 is a diagrammatic plan view of the running gear of a wagon with the brake and draft appliances arranged in accordance with this invention, and, Figure 2 is a detail view.

Referring to Figure 1 of the drawings—the parts of the running gear are generally designated—the tongue, 10, coupling pole, 11, front and rear axles 12 and 13 respectively provided with wheels 14 and 15. A double-tree 16 with singletrees 17 are shown carried on the tongue, and a brake beam with its brake shoes which cooperate with the rear wheels are also represented and a manually operating brake linkage 19 connected with it and an operating lever 20.

A pair of springs 21 are connected with the brake beam 18 and the rear axle 13, and are such as will produce sufficient tension upon the brake beam as to normally apply the brakes to the proper degree.

The tongue 10 to which the double-tree 16 is pivoted, is slotted at 22, as best shown in Figure 2, so that the double-tree with its pivot bolt 23 can have longitudinal play therein. A spring 24, similar to springs 21, is connected with the pivot bolt 23 by means of a U-shaped rod 25 extending through it and around the bolt; a similar rod 26 connects the spring with the frame. Another rod, 27, is represented as extending through the spring for connecting the double-tree with a cable or other flexible element 28 which extends rearwardly along the running gear and is connected with the brake beam 18, as shown.

In operation the draft is transmitted, first by means of cable 28 to the brake beam for releasing the brakes. The spring 24, is normally expanded and relatively loose when the vehicle is at rest, but when the draft is applied for drawing the vehicle, it is placed under compression as the brakes are released, and is adapted to resiliently carry the load. The springs, of course, vary in their specifications according to the load to be drawn; for example, in a vehicle adapted to carry a ton and a half (gross), the springs 21 would each exert a normal force of 100 pounds on the brake beams and the front spring would be required to carry the stress due to the 3000 pound load.

When it is desired to back the vehicle, the brakes have to be released, and for this purpose the hand lever 20 is moved to force the brake beam and brakes out of engagement with the wheels.

Having set forth one form of the invention, it is not desired to have it confined closely to the specific structure shown, it being understood that changes may be made in form, proportion, and organization of its various parts without departing from the spirit of the invention as indicated by the scope of the following claims:—

1. The combination with the running gear of a vehicle including a brake beam having brakes for the rear wheels of the vehicle, and a draft appliance in the forward part of the vehicle having a pin and slot connection with the running gear, spring means normally operating on the brake beam for applying the brakes, a connection between the draft appliance and said brake beam for retracting the brakes, and spring means between the running gear and said pin and slot connection.

2. In combination with a wagon, the running gear of which includes a brake beam having brakes for the rear wheels of the wagon and a double-tree draft appliance pivoted in a slot in the tongue of the wagon so as to have longitudinal movement therein, a pair of springs connected with the rear axle and the brake beam for normally applying the brakes, a spring connected with the double-tree at its pivotal connection and with the wagon frame for normally holding the double-tree toward the wagon and adapted to resiliently transmit the draft thereto, and a connection between the double-tree and brake beam for releasing the brakes when a draft is applied to the double-tree.

In testimony whereof he affixes his signature.

WILLIAM W. HENDERSON.